United States Patent [19]

Benson et al.

[11] Patent Number: 5,200,160
[45] Date of Patent: Apr. 6, 1993

[54] PROCESS FOR REMOVING SULFUR DIOXIDE AND NITROGEN OXIDES FROM FLUE GASES

[75] Inventors: Lewis B. Benson, Coraopolis; Yungli J. Lee, Lancaster; John W. College, Pittsburgh, all of Pa.

[73] Assignee: Dravo Lime Company, Pittsburgh, Pa.

[21] Appl. No.: 751,754

[22] Filed: Aug. 29, 1991

[51] Int. Cl.$^5$ ............................................. B01D 53/34
[52] U.S. Cl. ................................... 423/235; 423/239; 423/242.2; 423/243.07
[58] Field of Search ............... 423/243, 235, 239, 242, 423/244

[56] References Cited

U.S. PATENT DOCUMENTS

| | | | |
|---|---|---|---|
| 4,547,349 | 10/1985 | Lane | 423/640 |
| 4,565,678 | 1/1986 | Zielke et al. | 423/235 |
| 4,612,175 | 9/1986 | Harkness et al. | 423/235 |
| 4,670,234 | 6/1987 | Holter | 423/235 |
| 4,761,270 | 8/1988 | Turchan | 423/235 |
| 4,778,664 | 10/1988 | Grinstead | 423/235 |
| 4,830,766 | 5/1989 | Gallup et al. | 252/178 |
| 4,879,102 | 11/1989 | Hoppe et al. | 423/235 |
| 4,957,716 | 9/1990 | Clchanowicz et al. | 423/235 |

FOREIGN PATENT DOCUMENTS

| | | | |
|---|---|---|---|
| 3504157 | 8/1986 | Fed. Rep. of Germany | 423/243 |
| 53-17588 | 2/1978 | Japan | 423/235 |
| 86-06981 | 12/1986 | PCT Int'l Appl. | 423/243 |

OTHER PUBLICATIONS

Lee, Y. J., Abstracts of Papers, 200th ACS National Meeting, Division of Fuel Chemistry, Abstracts #76 and 85 (1990).
Lee, Y. J., et al. "Production and Application of Thiosulfate in Lime-Based Wet FGD". Preprints of papers, American Chemical Society Division of Fuel Chemistry, vol. 35, #4 (1990).
Lee, Y. J., et al. "Chemical Regeneration of Fe(II)--EDTA in Wet Scrubbers". Preprints of papers, American Chemical Society Division of Fuel Chemistry, vol. 35, #4 (1990), pp. 1427–1432.

*Primary Examiner*—Michael Lewis
*Assistant Examiner*—Peter T. DiMauro
*Attorney, Agent, or Firm*—Armstrong & Kubovcik

[57] ABSTRACT

A process for removing sulfur dioxide and nitrogen oxide from flue gases in a wet scrubbing system using lime to remove the sulfur dioxide and ferrous-EDTA to remove the nitrogen oxides, where an initial reducing agent, such as sodium sulfide, and an antioxidant, such as hydrazine, are added to the scrubbing system, with oxidation of the ferrous-EDTA to ferric-EDTA curtailed while removal of nitrogen oxides is increased.

18 Claims, 2 Drawing Sheets

PROCESS FOR REMOVING SULFUR DIOXIDE AND NITROGEN OXIDES FROM FLUE GASES

FIELD OF THE INVENTION

The present invention relates to an improved process for removing sulfur dioxide from flue gases while at the same time removing nitrogen oxides therefrom.

BACKGROUND OF THE INVENTION

The combustion of coal and other fossil fuels, as is known, produces flue gases that contain sulfur dioxide. In addition, nitrogen oxides are also produced which are carried in the flue gases. While efforts for reducing pollution caused by such flue gases were initially concentrated to removing the sulfur dioxides, recent regulations have also provided that the nitrogen oxide content of flue gases, prior to discharge to the atmosphere, must also be lowered.

Aqueous scrubbing slurries are known which use calcium components such as lime for removing sulfur dioxide. Especially useful such slurries formed from calcium hydroxide and magnesium hydroxide have been found to be very effective in the removal of sulfur dioxides from flue gases in wet scrubbers. Such wet scrubbing processes are illustrated by the teachings of U.S. Pat. Nos. 3,919,393, 3,919,394 and 3,914,378, all assigned to the assignee of the present invention.

The removal of nitrogen oxides from flue gases, however, continues to provide problems in wet scrubbing systems. While the use of ferrous ethylenediaminetetracetic-acid (ferrous-EDTA) has been found to be effective in acting as a promoter to remove nitrogen oxides from flue gases, a problem exists in that ferrous-EDTA oxidizes to ferric-EDTA in systems where oxygen is present and the ferric-EDTA is not reactive for nitrogen oxide removal. Examples of such a process, where sulfur dioxide and nitrogen oxides are removed from flue gases are described in U.S. Pat. No. 4,612,175 and U.S. Pat. No. 4,670,234, the contents of both said patents incorporated by reference herein.

It would be beneficial to use ferrous-EDTA in a sulfur dioxide scrubbing system to simultaneously remove nitrogen dioxides from a flue gas. However, such retrofit technology has not been successfully applied to commercial-scale scrubbing systems, primarily because the ferrous-EDTA, being readily oxidized to ferric-EDTA, is rendered ineffective in such oxygen-containing systems.

Attempts to use ferrous-EDTA as a nitrogen oxide remover in wet flue gas desulfurization systems also results in a buildup of nitrogen oxide reaction products in the liquid phase in the flue gas desulfurization systems. In addition, discharge of these reaction products in the sludge removed from the scrubbing system causes problems.

It is an object of the present invention to provide a process for simultaneous removal of sulfur dioxide and nitrogen oxides in a wet scrubbing system, where ferrous-EDTA is used as a promoter, which process minimizes loss of the expensive ferrous-EDTA, minimizes the buildup of nitrogen oxide reaction products in the liquid phase of the scrubbing system, and removes reaction products and most of the ferrous or ferric-EDTA from the scrubbing slurry before the slurry is concentrated and discharged as a solid waste for disposal.

SUMMARY OF THE INVENTION

A process is provided for the removal of sulfur dioxide and nitrogen oxides from flue gases where the flue gases are contacted in the scrubbing section of a liquid scrubbing unit with an aqueous scrubbing slurry that contains calcium components to remove the sulfur dioxide, and ferrous-EDTA to remove nitrogen oxides. A portion of the ferrous-EDTA, as is known, is oxidized to ferric-EDTA in such a wet scrubbing system. A portion of the aqueous slurry discharged from the scrubber is recycled thereto, while the remainder is discharged from the liquid scrubbing unit and passed to a thickener, with clarified liquor from the thickener returned to the liquid scrubbing unit.

In one embodiment of the present process, an initial reducing agent, such as sodium sulfide, is added to an aqueous slurry of a calcium compound, such as lime slurry, prior to introduction of the slurry into the liquid scrubbing unit. A further reducing agent, such as sodium dithionite, and an antioxidant, such as hydrazine, are then added to the aqueous scrubbing slurry, preferably to a recycle or hold tank of the liquid scrubbing unit. A portion of the aqueous scrubbing slurry discharged from the liquid scrubbing unit is recycled thereto, while the remainder of the aqueous scrubbing slurry is passed to a thickener and clarified. Thickener underflow, from the thickener is removed, while the clarified liquor is returned to the liquid scrubbing unit.

In another embodiment of the present process, the initial reducing agent is added to the aqueous slurry of calcium components prior to introduction of the slurry into the liquid scrubbing unit, and the remainder of the aqueous scrubbing slurry discharged from the scrubber is divided into first and second portions. The first portion of the remainder is passed to a regeneration tank and the further reducing agent and the antioxidant are added to regenerate the first portion of the remainder of the aqueous scrubbing slurry, which is then returned to the liquid scrubbing unit. The second portion of the remainder is passed to the thickener to produce a thickener underflow and a clarified liquor. The thickener underflow is discharged from the thickener while the clarified liquor has further, or make-up, ferrous-EDTA added thereto, and is then returned to the liquid scrubbing unit along with the further ferrous-EDTA.

In the present process, the thickener underflow that is discharged from the thickener is preferably filtered to produce a solid waste and a filtrate, and the filtrate, which contains sulfur and nitrogen components, is treated so as to remove those nitrogen and sulfur components, with the treated filtrate returned to the thickener.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
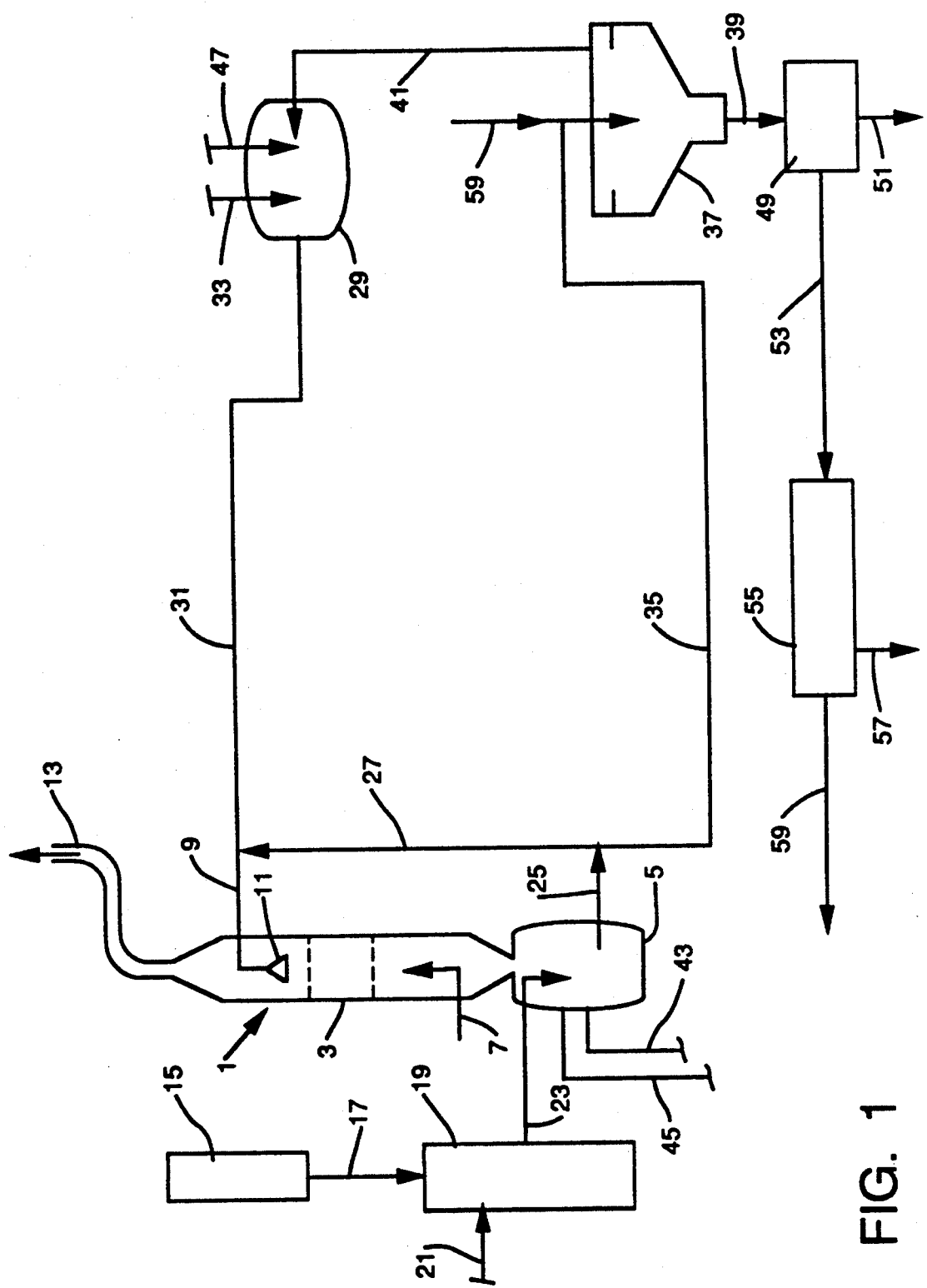
FIG. 1 is a flow diagram illustrating one embodiment of the process of the present invention.

The present process removes sulfur dioxide and nitrogen oxides from gases, such as flue gases resulting from the combustion of coal, where a calcium component is used to remove the sulfur dioxide and ferrous-EDTA is used to remove the nitrogen oxides. The removal of sulfur dioxide and nitrogen oxides is by contact of an aqueous scrubbing slurry with the flue gases in the scrubbing section of a liquid scrubbing slurry.

The calcium component used to remove the sulfur dioxide may be lime or limestone that is formed into an aqueous slurry. If desired, other sulfur dioxide removal compounds may be added in a minor amount, based on the calcium component, such as magnesium oxide or hydroxide or sodium oxide or hydroxide. Preferably, the calcium component is lime that contains a minor amount of magnesium oxide, such as will provide an effective magnesium ion content in a scrubbing tower of between about 2500 to 9000 parts per million.

In accordance with the present process, an initial reducing agent is added to an aqueous slurry of calcium components prior to introduction of that aqueous slurry to the liquid scrubbing unit for admixture with the aqueous scrubbing slurry in the liquid scrubbing unit. The initial reducing agent is a sulfur-containing compound, and is preferably sodium sulfide, although other sulfur-containing compounds, such as sulfur, or polysulfides, may be used. Examples of polysulfides may be found in U.S. Pat. No. 4,976,937, issued Dec. 11, 1990, and assigned to the assignee of the present invention, the contents of said patent incorporated by reference herein. The sulfur-containing compound reducing agent is added to the lime slurry prior to introduction thereof into the liquid scrubbing unit, such as to a recycle or hold tank of the liquid scrubbing unit, so as to prevent the formation of hydrogen sulfide which may be formed in and escape from the liquid scrubbing unit.

The initial reducing agent is added to the aqueous slurry of calcium components in an amount sufficient to convert a portion of ferric-EDTA to ferrous-EDTA, but less than that which will cause precipitation of iron as ferrous-sulfide and ferrous disulfide (pyrite). When sodium sulfide is used in conjunction with an aqueous lime slurry, the sodium sulfide is most preferably added in an amount of about 0.1 mole per liter based on the amount of lime slurry.

The aqueous scrubbing slurry, as previously described, contains calcium components to remove sulfur dioxide from flue gases and ferrous-EDTA to remove nitrogen oxides. Also, as previously described, ferrous-EDTA is oxidized to ferric-EDTA in the liquid scrubbing unit which is detrimental to operation of the removal process, and the ferric-EDTA must be reduced back to ferrous-EDTA to regenerate the aqueous scrubbing slurry.

In order to aid in the conversion of ferric-EDTA present in the aqueous scrubbing solution to ferrous-EDTA, a further reducing agent is added to the aqueous scrubbing slurry. The further reducing agent is a reductant, such as metallic iron or a sulfite salt of sodium, and is preferably sodium dithionite, although other sulfite salts, such as sodium sulfite and sodium pyrosulfite may be used.

The amount of further reducing agent added to the aqueous scrubbing slurry should be in an amount to convert at least a major portion of ferric-EDTA present in the aqueous scrubbing slurry being regenerated to ferrous-EDTA.

In addition to the further reducing agent, an antioxidant is added to the aqueous scrubbing slurry, in order to minimize the oxidation of ferrous-EDTA therein to ferric-EDTA. While at times, various compounds may be listed as a reducing agent or as an antioxidant, depending upon the context in which the terms are used, the term "reducing agent" as used herein is used to describe a compound that reacts with ferric-EDTA to convert the same to ferrous-EDTA at a faster rate than the compound reacts with oxygen, while the term "antioxidant" as used herein is used to describe a compound that reacts with oxygen at a faster rate than it would react with ferric-EDTA to reduce the same to ferrous-EDTA. Thus, the reducing agent preferably converts ferrous-EDTA to ferric-EDTA rather than remove oxygen from the system, while the antioxidant preferentially reacts with oxygen to remove oxygen from the system rather than convert ferric-EDTA in the system to ferrous-EDTA.

The antioxidant that is added to the aqueous scrubbing slurry to minimize the oxidation of ferrous-EDTA is preferably hydrazine or glyoxal. The antioxidant is added to the aqueous scrubbing slurry in an amount sufficient to react with a major portion of the dissolved oxygen in the scrubbing liquor, and when hydrazine is used as the antioxidant, the hydrazine is preferably added in an amount to provide between 10–100 millimoles per liter of hydrazine in the aqueous scrubbing slurry in the scrubbing section of the liquid scrubbing unit.

While various antioxidants may be used which are compatible with the scrubbing liquor, the antioxidant is preferably selected from the group consisting of hydrazine and glyoxal, since disassociation of such compounds leave no residual detrimental ions in the scrubbing liquor. Hydrazine ($N_2H_4$), for example, will disassociate to form nitrogen gas and water:

$$N_2H_4 + O_2 \rightarrow N_2 + 2H_2O$$

while glyoxal, for example, will disassociate to form carbon dioxide and water:

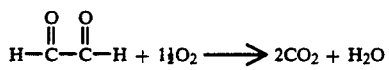

These antioxidants thus leave no detrimental ions in the scrubbing system that could upset the nature of the $SO_2$ and $NO_x$ removal.

In the present process, a portion of the aqueous scrubbing slurry discharged from the liquid scrubbing unit is recycled to the scrubbing section of the liquid scrubbing unit while the remainder of the aqueous scrubbing slurry is discharged and passed to a thickener where a clarified liquor and a thickener underflow are produced. The clarified liquor is returned to the scrubbing unit while the thickener underflow which contains calcium sulfite and bisulfite is removed. The thickener underflow is further concentrated, such as by filtering, and the concentrated solids of calcium sulfite are removed and discarded, or further treated for recovery. The filtrate, which will contain some dissolved sulfur and nitrogen components and some ferrous-EDTA and/or ferric-EDTA, is then treated to removed nitrogen and sulfur components therein, with the treated filtrate returned to the thickener for recovery of the ferrous-EDTA and/or ferric-EDTA.

The treatment of the filtrate to remove sulfur and nitrogen components therein may be effected by known methods, and is not itself a separate feature of the present process. For example, hydroxylaminedisulfonate in the filtrate may be decomposed according to the method described in U.S. Pat. No. 4,957,716, or the like.

Referring now to FIG. 1, one embodiment of the present process is schematically illustrated, wherein a liquid scrubbing unit 1, having a scrubbing section 3 and a recycle or hold tank 5, is provided and flue gases are fed thereto through line 7, with an aqueous scrubbing slurry of calcium components fed to the scrubber through line 9 and spargers 11, the flue gases contacting the aqueous scrubbing slurry in the scrubbing section 3 of the scrubbing unit preferably by countercurrent flow. Cleaned gases are discharged from the scrubbing unit 1 through an outlet 13 The aqueous slurry of calcium components, such as lime, may be formed in a lime slaker 15 by mixing lime with water, and the aqueous lime slurry formed passed through line 17 to a lime tank 19. In lime tank 19, an initial reducing agent, such as sodium sulfide is added through line 21, prior to introduction of the aqueous lime slurry through line 23 to the recycle or hold tank 5 of the liquid scrubbing unit 1 for use in the liquid scrubber unit 1. A portion of the aqueous slurry discharged from the liquid scrubbing unit is recycled, as is conventional, to the scrubbing section 3 of the liquid scrubbing unit 1 through lines 25, 27 and 9. Ferrous-EDTA is added to the aqueous slurry, such as from a surge tank 29, through line 31, to the recycle slurry in line 9, the ferrous-EDTA fed to the surge tank 29 through line 33.

The remainder of the aqueous scrubbing slurry is passed through line 35 to a thickener 37 where a thickener underflow and a clarified liquor are produced and separated, with the thickener underflow discharged through line 39. The clarified liquor, or overflow, from the thickener 37 is passed through line 41 to a vessel, such as the surge tank 29, and further ferrous-EDTA, for make-up, is added to the clarified liquor therein. The clarified liquor with the further ferrous-EDTA is then returned to the liquid scrubbing unit I through lines 31 and 9.

In this embodiment of the present process, a further reducing agent, such as sodium dithionite, is added to the aqueous scrubbing slurry by introducing the further reducing agent to the hold tank 5 of the liquid scrubbing unit 1 through line 43. Also, an antioxidant, such as hydrazine, is added to the aqueous scrubbing slurry by introducing the antioxidant to the hold tank 5 of the liquid scrubbing unit 1 through line 45. In instances where additional antioxidant may be desired, the additional antioxidant may be added to the surge tank 29 through line 47.

The thickener underflow that is discharged from the thickener 37 through line 39 is separated, such as in a filter 49, to produce a solid waste and a filtrate, which solid waste is removed from the system through line 51. The filtrate, or liquid, from filter 49 may be passed through line 53 to a nitrogen-sulfur treatment tank 55 so as to remove nitrogen and sulfur compounds present in the filtrate therefrom. In the treatment tank 55, the nitrogen and sulfur components present in the filtrate are treated and removed through line 57, and a filtrate with nitrogen and sulfur compounds removed therefrom, but which will contain ferric and/or ferrous-EDTA is discharged from the nitrogen-sulfur treatment tank 55 an passed through line 59 back to the thickener 37 where the recovered ferric and ferrous-EDTA is recycled to the scrubbing system with the clarified liquor removed from the treatment tank through line 41.

Figure 2:
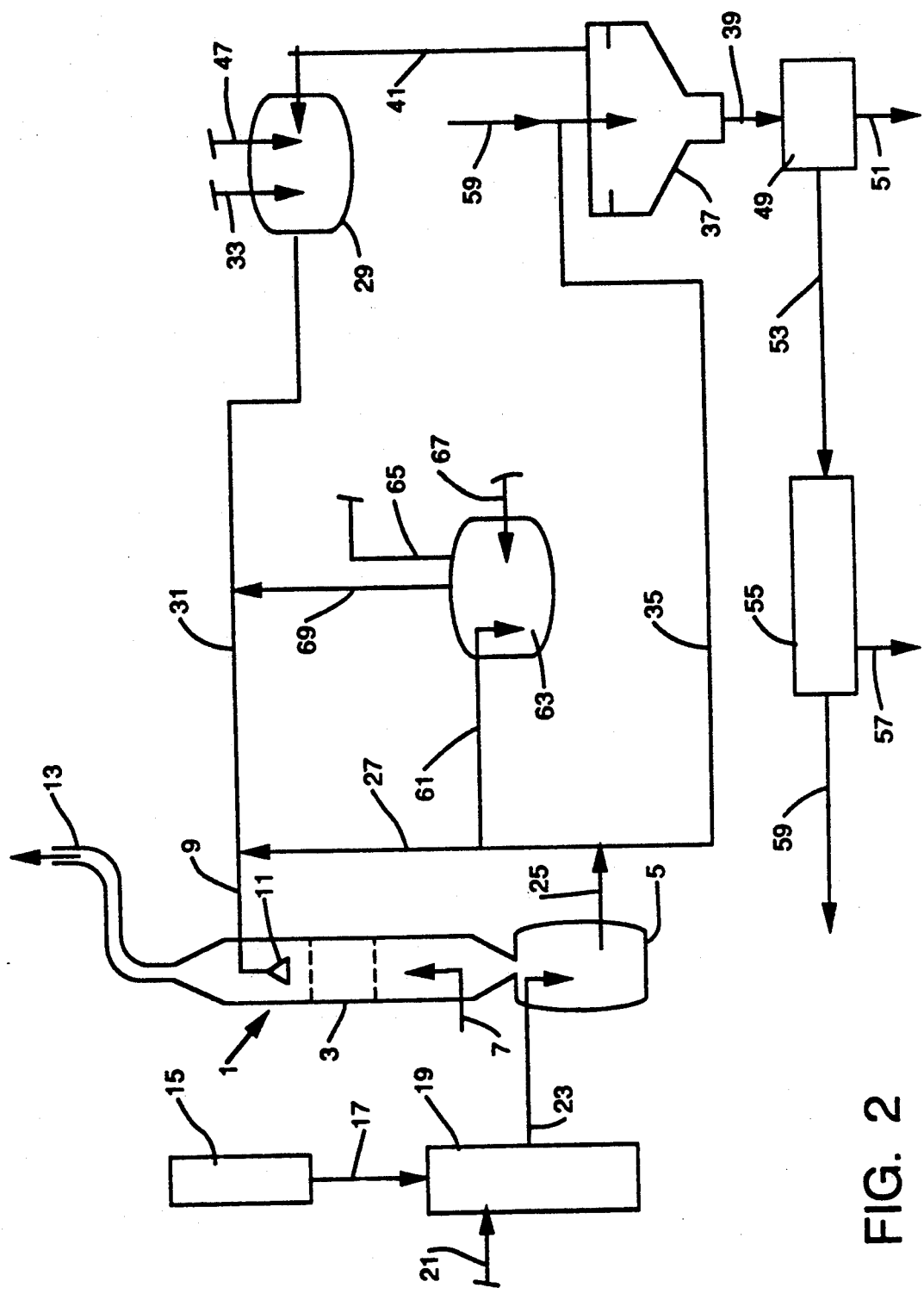
FIG. 2 is a flow diagram illustrating another embodiment of the process of the present invention.

Another embodiment of the present process is schematically illustrated in FIG. 2. In this embodiment, wherein like components are identified by the numerals used in FIG. 1, a liquid scrubbing unit 1, with scrubbing section 3 and hold tank 5, is provided and flue gases are fed thereto through line 7, with an aqueous scrubbing slurry of calcium components fed to the scrubber through line 9 and spargers 11, the flue gases contacting the aqueous scrubbing slurry in scrubbing section 3 of the scrubbing unit 1 preferably by countercurrent flow. Cleaned gases are discharged from the scrubbing unit 1 through an outlet 13. The aqueous slurry of calcium components, such as lime, may be formed in a lime slaker 15 by mixing lime with water, and the aqueous lime slurry formed passed through line 17 to a lime tank 19. In the lime tank 19, an initial reducing agent is added through line 21, prior to introduction of the aqueous lime slurry through line 23 to a recycle or hold tank 5 of the liquid scrubbing unit for use in the liquid scrubber unit 1. A portion of the aqueous slurry discharged from the liquid scrubbing unit is recycled, as is conventional, to the scrubbing section 3 of the wet scrubbing unit 1 through lines 25, 27 and 9. Ferrous-EDTA is added to the aqueous slurry, such as from a surge tank 29, through line 31, to the recycle slurry in line 9, the ferrous-EDTA fed to the surge tank 29 through line 33.

In accordance with this embodiment of the present process illustrated in FIG. 2, the remainder of the aqueous scrubbing slurry discharged from the scrubbing unit 1, that is not immediately recycled, is divided into two portions. A first portion of the remainder is passed through line 61 to a regeneration tank 63. To the first portion of the remainder of the aqueous scrubbing slurry in regeneration tank 63, there is added a further reducing agent, such as sodium dithionite, in an amount sufficient to reduce ferric-EDTA therein to ferrous-EDTA, through line 65, and an antioxidant, such as hydrazine, through line 67. The amount of reducing agent added to the regeneration tank 63 is an amount sufficient to reduce at least a major portion of any ferric-EDTA present in the first portion of the remainder of the aqueous scrubbing slurry to ferrous-EDTA. After regeneration of the first portion of the remainder of the aqueous slurry in the regeneration tank 63, the first portion is returned to the liquid scrubbing unit I such as through line 69 to line 31 and then to line 9 for charging thereto.

A second portion of the remainder of aqueous scrubbing slurry is passed through line 35 to a thickener 37 where a thickener underflow and a clarified liquor are produced and separated, with the thickener underflow discharged through line 39. The clarified liquor, or overflow, from the thickener 37 is passed through line 41 to a vessel, such as surge tank 29, and further ferrous-EDTA, for make-up, is added to the clarified liquor therein. The clarified liquor with th further ferrous-EDTA is then returned to the liquid scrubbing unit 1 through lines 31 and 9. If desired, further antioxidant may also be added to the clarified liquor in surge tank 29 through line 47.

The thickener underflow that is discharged from the thickener 37 through line 39 is separated and treated as is described with reference to the process described in FIG. 1.

EXAMPLE

A series of scrubbing tests were run in a 5 kw test unit to determine results achieved using the present process.

A synthetic flue gas was produced by mixing air and nitrogen and by adding $SO_2$ and NO to achieve desired concentrations. Usually, oxygen was maintained at 5 percent by volume, $SO_2$ at 2000 parts per million by volume, and NO at 650 parts per million by volume. No nitrogen dioxide ($NO_2$) was added, since a few percent of the NO in the synthetic gas is converted to $NO_2$ through gas-phase oxidation. Gas flow entering the scrubber was about 10 standard cubic feet per minute (SCFM). The gas was heated (120° F.) by contact with the absorbing slurry, with a portion of the slurry circulated through a heated core. Absorber slurry was circulated from the recycle tank to the absorber (10 liter capacity) by a variable-speed tubing pump. The flow rate was usually 0.6 liters per minute (liquid to gas ratio, L/G=12). The gas-liquid contact zone in the scrubber absorber was about one foot long and a superficial gas velocity of about one foot per second provided. Ferrous EDTA was added to provide 100 mM Fe-EDTA (10 percent molar excess EDTA over iron). Scrubbed gas was sampled continuously and cooled to remove moisture before flowing to analyzers for $SO_2$, $NO_x$ and $O_2$. After contacting the gas, the slurry from the absorber fell into the recycle tank. Lime slurry, containing 6 weight percent MgO was added to control pH, usually at a pH of 7. A portion of the slurry was pumped to a thickener to allow accumulated solids to settle. Solids were withdrawn periodically from the thickener and filtered, with filtrate returned to the thickener. Operation of the thickener allowed the entire unit to run for long periods to allow the concentrations of ferrous iron, NO-reaction products and other liquid-phase constituents to begin to approach their steady-state concentrations. The volumes in the recycle tank and the thickener were about 5 liters and 7.8 liters respectively. Liquid which overflowed the thickener was essentially free of solids.

The series of tests were run, as listed in the following Table, where Test A had no reducing agent or antioxidant added; Test B had only a reducing agent, sodium sulfide added, Tests C, D and E had only an antioxidant, hydrazine, added (in the amounts listed); and Tests F, G, H and I had hydrazine added as an antioxidant (in the amounts listed) and regeneration effected with sodium dithionite (20 to 30 g. per regeneration). In Test J, the pH was maintained at 6.5 and the Fe EDTA added in an amount of 35 mM (20% excess), hydrazine and dithionite regeneration comparable to Test I and 0.1 M $Na_2S$ added to the lime; Test K shows addition of glyoxal, as an antioxidant, with sodium sulfide added to the lime as a reducing agent. Test L used a pH of 6.5 and FeEDTA was added in an amount of 35 mM (20% excess). The results of the tests are given as the following Table:

| TEST | ADDITIVE | $FE^{++}$ mM TIME (MIN.) | | | | $NO_x$ REMOVAL % TIME (MIN.) | | | |
|---|---|---|---|---|---|---|---|---|---|
| | | 0 | 50 | 100 | % | 0 | 50 | 100 | % |
| A | BASELINE | 88 | 55 | 43 | 45 | 49 | 51 | 40 | 34 | 17 | 67 |
| B | 0.1M $Na_2S$ (alone) | 88 | 61 | 50 | 38 | 57 | 50 | 41 | 35 | 15 | 70 |
| C | 100 mM $N_2H_2$ (alone) | 88 | 72 | 67 | 22 | 76 | 45 | 44 | 43 | 2 | 95 |
| D | 100 mM $N_2H_2$ (alone) | 88 | 78 | 70 | 18 | 80 | 46 | 45 | 44 | 2 | 96 |
| E | 10 mM $N_2H_2$ (alone) | 90 | 67 | 57 | 33 | 63 | 50 | 44 | 38 | 12 | 76 |
| F | 10 mM $N_2H_2$ + Dithionite regen. | 83 | 48 | 44 | 39 | 53 | 52 | 42 | 42 | 10 | 81 |
| G | 20 mM $N_2H_2$ + Dithionite regen. | 100 | 66 | 69 | 31 | 69 | 55 | 48 | 48 | 7 | 87 |
| H | 25 mM $N_2H_2$ + Dithionite regen. | 85$^a$ | 62 | 60 | 25 | 71 | 50 | 41 | 42 | 8 | 84 |
| I | 25 mM $N_2H_2$ + Dithionite regen. | 85 | 56 | 50 | 35 | 59 | 50 | 40 | 42 | 8 | 84 |
| J | 35 mM $Fe^{++}$ + 0.1M $Na_2S$ | 29 | — | — | — | — | 30 | 29 | 25 | 5 | 83 |
| K | 35 mM Glyoxal | 100 | 87 | 69 | 31 | 69 | 50 | 45 | 35 | 15 | 70 |
| L | 35 mM Glyoxal + 0.15M $Na_2S$ in 10% lime | 35 | 31 | 31 | 4 | 88 | 32 | 31 | 31 | 1 | 97 |

$^a$estimated

As shown by the tests, the use of reducing agent in combination with an antioxidant resulted in an increase in the $Fe^{++}$ EDTA retention in the slurry (less conversion to $Fe^{+++}$ EDTA) and an increased $NO_x$ removal relative to the BASSLINE Test.

What is claimed is:

1. In a process for the removal of sulfur dioxide and nitrogen oxides from flue gases by contact in the scrubbing section of a liquid scrubbing unit, having a scrubbing section and a hold tank, of the flue gases with an aqueous scrubbing slurry of calcium components to remove sulfur dioxide and which aqueous scrubbing slurry contains ferrous-EDTA as a promoter to remove nitrogen oxides, with a portion of the ferrous-EDTA oxidized to ferric-EDTA in the liquid scrubbing unit, and wherein a portion of the aqueous slurry discharged from the liquid scrubbing unit is recycled to the scrubbing section of said liquid scrubbing unit, while the remainder of the aqueous scrubbing slurry is discharged from the liquid scrubbing unit and passed to a thickener and clarified, with clarified liquid from said thickener returned to the liquid scrubbing unit, the improvement comprising:

adding a sulfur-containing compound selected from the group consisting of sulfur, a sulfide and a polysulfide, as an initial reducing agent, in an amount sufficient to convert a portion of ferric-EDTA to ferrous EDTA, but less than that which will cause precipitation of iron as ferrous sulfide and ferrous disulfide, to an aqueous slurry of calcium components, prior to introduction thereof into said liquid scrubbing unit for admixture with said aqueous scrubbing slurry;

adding a further reducing agent, selected from the group consisting of metallic iron and a sulfite salt of sodium, to said aqueous scrubbing slurry in an amount sufficient to convert at least a major portion of ferric-EDTA contained therein to ferrous-EDTA;

adding an antioxidant, selected from the group consisting of hydrazine and glyoxal, in an amount sufficient to react with a major portion of dissolved oxygen in the scrubbing liquor, to said aqueous scrubbing slurry, to minimize the oxidation of ferrous-EDTA therein to ferric-EDTA in the scrubbing section of said scrubbing liquid unit;

passing the remainder of said aqueous scrubbing slurry to said thickener to produce a thickener underflow and said clarified liquor;

removing said thickener underflow from said thickener; and returning said clarified liquor to said liquid scrubbing unit.

2. The process as defined in claim 1, wherein said calcium component is lime containing a minor amount of magnesium oxide.

3. The process as defined in claim 1, wherein said initial reducing agent is sodium sulfide, and said calcium component is lime.

4. The process as defined in claim 3 wherein said sodium sulfide is added to the aqueous slurry of lime in an amount of about 0.1 mole per liter based on the amount of said lime slurry.

5. The process as defined in claim 1, wherein said further reducing agent is sodium dithionite.

6. The process as defined in claim 1, wherein said antioxidant is hydrazine.

7. The process as defined in claim 6, wherein said hydrazine is added in an amount sufficient to provide between 10-100 millimoles of hydrazine per liter of aqueous scrubbing slurry in the scrubbing section of said liquid scrubbing unit.

8. The process as defined in claim 1, wherein said antioxidant is glyoxal.

9. The process as defined in claim 1, wherein said removed thickener underflow is filtered to produce a solid waste and a filtrate, and wherein said filtrate is treated to remove nitrogen and sulfur components contained therein and said treated filtrate is returned to said thickener.

10. The process as defined in claim 1, wherein said remainder of said aqueous slurry discharged from the liquid scrubber is divided into first and second portions, said first portion is passed to a regeneration tank and said further reducing agent and antioxidant are combined therewith in said regeneration tank, said regenerated first portion of said remainder is returned to said liquid scrubbing unit, and said second portion is passed to said thickener.

11. In a process for the removal of sulfur dioxide and nitrogen oxides from flue gases by contact in the scrubbing section in a liquid scrubbing unit, having a scrubbing section and a hold tank, of the flue gases with an aqueous scrubbing slurry of calcium components to remove sulfur-dioxide and which aqueous scrubbing slurry contains ferrous-EDTA as a promoter to remove nitrogen oxides, with a portion of the ferrous-EDTA oxidized to ferric-EDTA in the liquid scrubbing unit, and wherein a portion of the aqueous slurry discharged from the liquid scrubbing unit is recycled to the scrubbing section of said liquid scrubbing unit, while the remainder of the aqueous slurry is discharged from the liquid scrubbing unit and passed to a thickener and clarified, with clarified liquid from said thickener returned to the liquid scrubbing unit, the improvement comprising:

adding a sulfur containing compound selected from the group consisting of sulfur, a sulfide and a polysulfide, as an initial reducing agent in an amount sufficient to convert a portion of ferric-EDTA to ferrous EDTA, but less than that which will cause precipitation of iron as ferrous sulfide and ferrous disulfide, to an aqueous slurry of calcium components prior to introduction thereof into said liquid scrubbing unit;

passing a first portion of said remainder of said aqueous slurry to a regeneration tank and adding thereto a further reducing agent, selected from the group consisting of metallic iron and a sulfite slat of sodium, to regenerate said portion, and an antioxidant, selected from the group consisting of hydrazine and glyoxal, in an amount sufficient to react with a major portion of dissolved oxygen in the scrubbing liquor;

returning said regenerated first portion of said remainder to said liquid scrubbing unit;

passing a second portion of said remainder of said aqueous slurry to said thickener to produce a thickener underflow and said clarified liquor;

removing said thickener underflow from said thickener;

adding further ferrous-EDTA to said clarified liquor; and returning said clarified liquor with said further ferrous-EDTA to said liquid scrubbing unit.

12. The process as defined in claim 11, wherein said calcium component is lime containing a minor amount of magnesium oxide.

13. The process as defined in claim 11, wherein said initial reducing agent is sodium sulfide, and said calcium component is lime.

14. The process as defined in claim 13, wherein said sodium sulfide is added to the aqueous slurry of lime in an amount of about 0.1 mole per liter based on the amount of said lime slurry.

15. The process as defined in claim 11, wherein said further reducing agent is sodium dithionite.

16. The process as defined in claim 11 wherein said antioxidant is hydrazine, and said hydrazine is added in an amount sufficient to provide between 10-100 millimoles of hydrazine per liter of aqueous scrubbing slurry in the scrubbing section of said liquid scrubbing unit.

17. The process as defined in claim 11, wherein said antioxidant is glyoxal.

18. The process as defined in claim 11, wherein said removed thickener underflow is filtered to produce a solid waste and a filtrate, and wherein said filtrate is treated to remove nitrogen and sulfur components contained therein and said treated filtrate is returned to said thickener.

* * * * *